INVENTOR
GEORGE J. ROZMAN

United States Patent Office

3,639,496
Patented Feb. 1, 1972

3,639,496
PROCESS FOR THE PRODUCTION OF
NAPHTHALENE
George J. Rozman, Ashland, Ky., assignor to
Ashland Oil, Inc., Houston, Tex.
Filed July 17, 1968, Ser. No. 745,517
Int. Cl. C07c *3/58, 7/10*
U.S. Cl. 260—674 N     19 Claims

ABSTRACT OF THE DISCLOSURE

Naphthalene is produced from hydrocarbon fractions containing substantial volumes of polycyclic aromatics, such as light cycle oils from a catalytic cracking unit, by contacting the hydrocarbon feed with an organic sulfoxide, such as dimethylsulfoxide; separating an extract phase and a first raffinate phase from one another; mixing the extract phase with water; passing the extract, solvent and water mixture to a clarifier to separate a second raffinate phase therefrom; passing this second raffinate phase to a dryer to remove water; passing clarified extract, solvent, and water to a first vacuum distillation unit to separate a solvent and water overhead from an extract bottoms; passing the bottoms from the vacuum distillation unit to a hydrodealkylation unit to produce naphthalene; mixing the first raffinate from the extractor with water; passing the mixture of first raffinate and water to a clarifier to separate the raffinate therefrom; passing the first raffinate to a dryer to remove residual water therefrom; combining clarified water and solvent from the clarifier with the water and solvent from the first vacuum distillation unit; passing the combined solvent and water streams to a second vacuum distillation unit to separate the water and the solvent; and recycling the solvent to the solvent extractor.

BACKGROUND OF THE INVENTION

Field of the invention

The present invention relates to the production of naphthalene from hydrocarbon feedstocks by solvent extraction followed by hydrodealkylation. More specifically, the present invention relates to the production of naphthalene from petroleum feedstocks containing substantial volumes of polycyclic hydrocarbons by extraction of the hydrocarbon feedstock with an organic sulfoxide and subjecting recovered polycyclic hydrocarbons to hydrodealkylation.

Description of the prior art

The commercial importance of naphthalene resides primarily in its use as an intermediate in the production of phthalic anhydride. For example, roughly 80% of all of the naphthalene produced domestically is consumed in the production of phthalic anhydride.

Heretofore, the primary source of naphthalene has been coal tar fractions. However, the uncertainties and fluctuations in the production of coal tars makes it undesirable to tie the production of naphthalene to variable sources of coal tars, particularly since the major portion of coal tar is produced as a by-product of the manufacture of coke for the production of steel.

Naphthalene does not exist in any great volumes in crude petroleum hydrocarbons. While the amounts of naphthalene in crude oils varies to some extent, the total of all bicyclic aromatic hydrocarbons in petroleum is usually about 5% to 30%. Accordingly, it is impractical to separate such naphthalene from the crude by simple distillation, since a number of other contaminating materials boil in the same boiling range. However, certain refined petroleum fractions, such as fractions obtained as products of catalytic reforming, catalytic cracking and thermal cracking, do contain significant quantities of naphthalene and alkyl-substituted naphthalenes to be of interest as feedstocks for further processing. Some feedstocks, and, particularly, products of reforming which boil above 420° F., contain large quantities of naphthalenes and alkyl-substituted naphthalenes and lesser quantities of monocyclic aromatics and saturated hydrocarbons. These feeds may, therefore, be directly processed in a hydrodealkylation unit to convert the alkyl naphthalenes to naphthalene. However, when attempting to process fractions containing smaller amounts of naphthalene precursors, it becomes impractical and prohibitively expensive, to directly hydrodealkylate this material since the consumption of hydrogen is extremely high due to the hydrogenation of large quantities of monocyclic aromatics and the hydrodealkylation catalysts are subject to rapid deactivation when utilizing a catalytic hydrodealkylation system.

While a number of techniques for concentrating naphthalene precursors have been tested in the past, and found useful to a greater or lesser extent, none have been found to economically produce substantial quantities of naphthalene precursors which, in turn, produce economic yields of naphthalene. However, a highly effective technique in accordance with the present invention has been the utilization of organic sulfoxides and, particularly dimethylsulfoxide, as a solvent for the separation of paraffins and monocyclic hydrocarbons from dicyclic or polycyclic hydrocarbons in the feed material. While organic sulfoxides have heretofore been suggested as a general solvent for separations of hydrocarbons, oxyorganic mixtures and the like, the commercial use of such solvents has been practically nil. There are believed to be two basic reasons for such lack of utility and these are primarily directed to the cost of the solvent. First of all, recovery of the solvent from the extract by distillation techniques is complicated by the fact that the sulfoxide decomposes over a period of time and at high temperatures. Hence, there has been no really effective means developed for recovery of the solvent and its re-use. Secondly, the prior art techniques for the utilization of organic sulfoxides as solvents specify that substantial volumes of water shall be present during the extraction operation in order to improve the selectivity of the solvent. Actually, the presence of water is more detrimental than it is helpful in the extraction of polycyclics from monocyclic and paraffinic hydrocarbons. A further complication in this same vein is that dimethylsulfoxide is so highly soluble in water that it is capable of absorbing over 70% of its own weight of water from the atmosphere at 68° F. and a 65% relative humidity.

SUMMARY OF THE INVENTION

It is therefore an object of the present invention to provide an improved method for the production of naphthalene. Another object of the present invention is to provide an improved method for the production of naphthalene from petroleum hydrocarbon mixtures. A still further object of the present invention is to provide an improved method for the production of naphthalene from catalytic light cycle oils obtained from the catalytic cracking of petroleum hydrocarbons. Another and further object of the present invention is to provide an improved method for the production of naphthalene by solvent extracting a petroleum hydrocarbon mixture containing saturated hydrocarbons, monocyclic aromatics, and dicyclic aromatics and to separate dicyclic aromatics therefrom and thereafter subjecting the dicyclic aromatic extract to catalytic hydrodealkylation. A still further object of the present invention is to provide an improved method for the production of naphthalene wherein a catalytic light cycle oil is subjected to solvent extraction with an organic sulfoxide, a raffinate phase and an extract phase containing the solvent are separated, the extract phase is separated into an extract and the solvent, the solvent is recycled to the extraction step and the extract is subjected to catalytic hydrodealkylation. Another object of the present invention is to provide an improved method for the separation of dicyclic hydrocarbons from mixtures of dicyclic, monocyclic and saturated hydrocarbons. Another and further object of the present invention is to provide an improved method for the recovery of polycyclic hydrocarbons from mixtures of polycyclic hydrocarbons, monocyclic aromatics and saturated hydrocarbons wherein the mixture is subjected to contact with an organic sulfoxide, the organic sulfoxide is separated from the extract fraction and the sulfoxide is then recycled to the extraction step. A further object of the present invention is to provide an improved method for the extraction of polycyclic hydrocarbons from a mixture of polycyclic aromatics, monocyclic aromatics and saturated hydrocarbons by contacting the mixture with an organic sulfoxide and recovering substantially pure extract and pure solvent from the extract phase. Yet another object of the present invention is to provide an improved technique for the extraction of polycyclic aromatics from a mixture of polycyclic aromatics, monocyclic aromatics and saturated hydrocarbons by contacting the mixture with dimethylsulfoxide, separating the dimethylsulfoxide from the extract phase and recycling the same to the extraction step without exposing the dimethylsulfoxide to the atmosphere.

These and other objects and advantages of the present invention will be apparent from the following description.

Briefly, in accordance with the present invention, naphthalene is produced from petroleum hydrocarbon mixtures containing polycyclic aromatics, monocyclic aromatics and saturated hydrocarbons by contacting the hydrocarbon mixture with an organic sulfoxide, separating a raffinate phase from an extract phase, mixing the raffinate phase with a sufficient quantity of water to separate residual solvent from the raffinate phase, mixing the extract phase with sufficient water to separate residual raffinate from the extract phase, subjecting the extract, solvent and water mixture to a vacuum distillation to separate solvent and water as an overhead fraction and extract, predominating in polycyclic hydrocarbons, as the bottoms fraction, subjecting the bottoms fraction to hydrodealkylation conditions to produce a product containing substantial volumes of naphthalene, subjecting the solvent and water overhead fraction to a second vacuum distillation to separate solvent from water, and recycling the solvent to the extractor. In another mode of operation, the extract phase from the extraction step is cooled to essentially ambient temperatures to thereby separate a further raffinate phase from the extract phase, this raffinate is mixed with the raffinate from the extraction step prior to mixing the raffinate with water to separate the raffinate from residual solvent and the remaining extract phase is sent to the vacuum distillation. The residual solvent and water separated from the raffinate phase may also be mixed with the overhead fraction of the first distillation prior to passing the overhead fraction to the second distillation unit.

The present invention will be more clearly understood by reference to the drawings when read in conjunction with the following detailed description.

BRIEF DESCRIPTION OF THE DRAWINGS

In accordance with the present invention, the details of the present invention may be best understoood by reference to the drawings, wherein.

DESCRIPTION OF THE PREFERRED EMBODIMENTS

Figure 1:
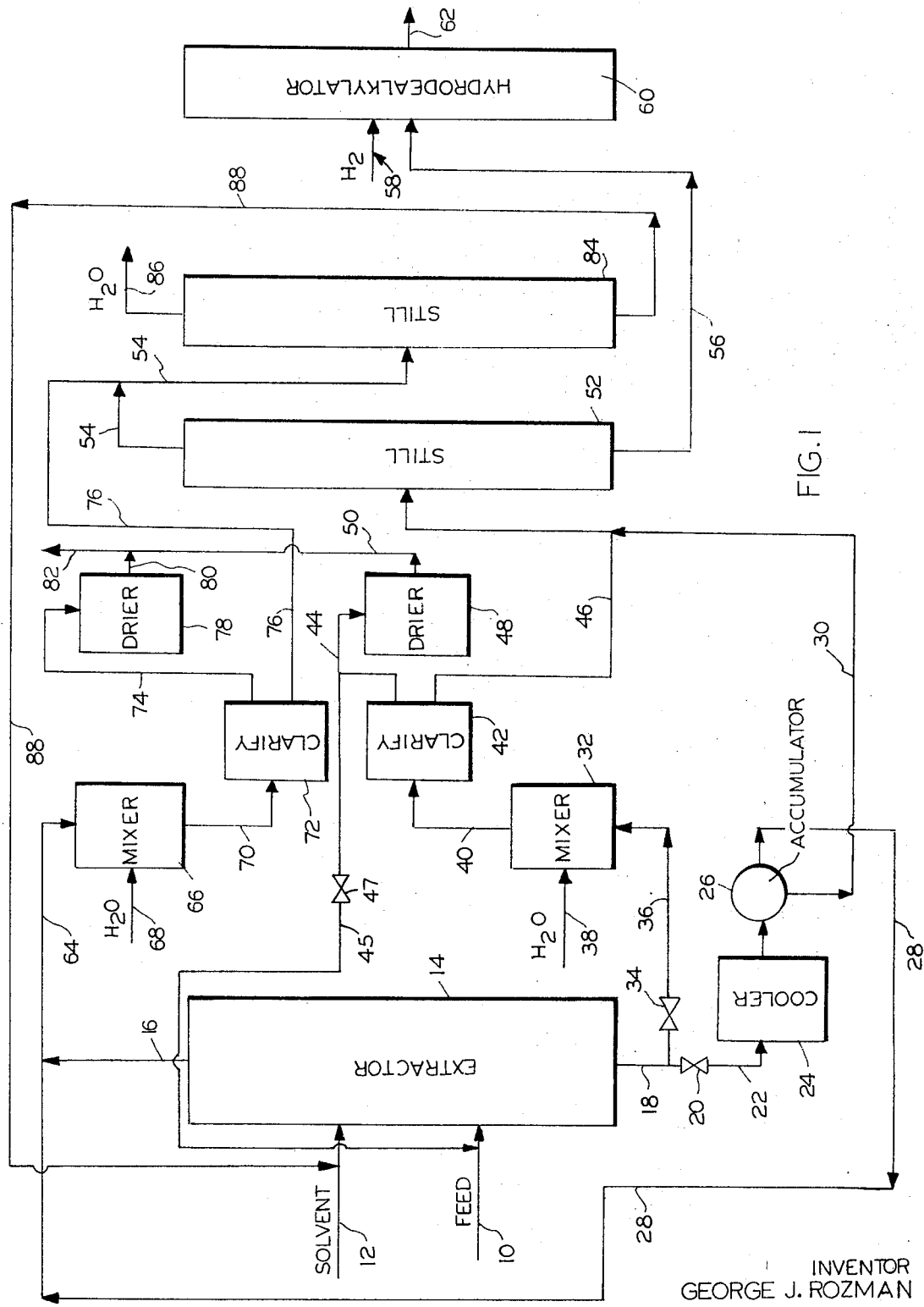
FIG. 1 is a flow diagram illustrating the operation of the present method.

Referring to the flow diagram of FIG. 1 of the drawings, a hydrocarbon feed is introduced to the system through line 10 and an organic sulfoxide solvent through line 12. These materials are contacted in extractor 14. Extractor 14 is a conventional liquid-liquid solvent extraction unit. From extractor 14, a raffinate phase is separated and discharged through line 16 and an extract phase is separated and discharged through line 18. If desired, the extract from line 18 may be passed through valve 20 and line 22 to cooler 24 and accumulator 26. In cooler 24, the extract is cooled to essentially ambient temperature to separate a further raffinate phase. The cooled product is separated in accumulator 26 to produce a raffinate which is discharged through a line 28 and added to the raffinate in line 16 and an extract which passes through line 30. Alternatively, if the cooler 24 and accumulator 26 are not utilized, extract from line 18 passes through valve 34 and line 36 to mixer 32. Water is added to the extract in mixer 32 through line 38. The water, solvent and extract from mixer 32 pass through line 40 to clarifier 42. Clarifier 42 may be a centrifuge or other separation unit and is preferably a pressurized centrifuge, to reduce loss of solvent through vaporization. Clarifier 42 removes a still further volume of raffinate which is discharged through line 44. Clarified extract, solvent and water from clarifier 42 are discharged through line 46. The raffinate from line 44 is passed to dryer 48 where entrained water is removed from the raffinate and the dried raffinate is discharged through line 50. If desired, the raffinate from dryer 48 could be recycled to extractor 14, through line 45 and valve 47, to remove small amounts of naphthalene bicyclic aromatics in this raffinate. The mixture of extract, solvent and water is then passed to vacuum distillation unit 52. In vacuum distillation unit 52, solvent and water are separated as an overhead and discharged through line 54 and extract is discharged as a bottoms through line 56. The extract from line 56 is mixed with hydrogen supplied through line 58 in hydrodealkylation reactor 60. The product of hydrodealkylation reactor 60 is discharged to storage through line 62. Raffinate from the extractor and from the accumulator, if the cooler-accumulator system is utilized, are combined and passed through line 64 to mixer 66. Water, introduced through line 68, is mixed with the raffinate and this combined stream is passed through line 70 to clarifier 72. Clarifier 72 is of the same nature as clarifier 42 and separates the mixture into a clarified raffinate phase, which is discharged through line 74, and a solvent-water phase, discharged through line 76. The raffinate phase from line 74 is passed to dryer 78 where residual water is removed and the dried raffinate is passed through line 80 where it is combined with the raffinate from line 50 and sent to storage through line 82. The solvent and water from line 76 is combined with solvent and water from line 54 and fed to a second vacuum distillation unit 84. In vacuum distillation unit 84, water is separated as an overhead and discharged through line 86 and solvent is separated as a bottoms and discharged through line 88 for recycle to extraction unit 14.

The hydrocarbon feed material, in accordance with the present invention, is a highly aromatic hydrocarbon liquid containing monocyclic aromatics, polycyclic aromatics and minor amounts of saturated hydrocarbons. More specifically, the feed material is a hydrocarbon mixture containing between about 20 and 40% or more of naphthalene precursors. Even though these naphthalene precursors appear to be present in rather substantial amounts, it has been found, in accordance with the present invention, that such feedstocks cannot be dealkylated to naphthalene directly but must be subjected to purification or concentration of the polycyclic aromatics prior to dealkylation. By such purification, it has been found possible to produce a highly concentrated dealkylation feedstock and thereby substantially reduce the hydrogen requirements in the dealkylation unit and producing higher concentrations of naphthalene per unit capacity of the dealkylation unit. A specific feedstock falling within this definition is a light cycle oil obtained by the catalytic conversion of petroleum hydrocarbon oils through contact with an acidic catalyst, for instance, a silica-alumina catalyst. A heart-cut of light cycle oil, boiling between about 400 and 600° F. can be utilized as a feedstock for the present process. However, this heart-cut should preferably boil between about 430 and 530° F. The properties of such a light cycle oil heart-cut are illustrated in the following Table I.

TABLE I.—PROPERTIES OF LIGHT CYCLE OIL

[Heart-cut]

| ASTM distillation: | | |
|---|---|---|
| IBP | ° F.. | 434 |
| 5 | ° F.. | 450 |
| 10 | ° F.. | 454 |
| 20 | ° F.. | 464 |
| 30 | ° F.. | 470 |
| 40 | ° F.. | 474 |
| 50 | ° F.. | 480 |
| 60 | ° F.. | 484 |
| 70 | ° F.. | 491 |
| 80 | ° F.. | 497 |
| 90 | ° F.. | 508 |
| 95 | ° F.. | 518 |
| EP | ° F.. | 530 |
| Gravity, API[60] | | 26.5 |
| $n_D^{20}$ | | 1.5145 |
| COC flash, ° F. | | 220 |
| COC fire, ° F. | | 225 |
| FIA (ASTM D1319) LV percent: | | |
| PN | | 33.2 |
| O | | 4.3 |
| A | | 62.5 |
| GC DEGA, LV percent: | | |
| <BMN | | 45.0 |
| BMN | | 3.1 |
| AMN | | 1.7 |
| DMN plus BP | | 14.8 |
| ACN and | | >35.4 |

By selecting a heart-cut it is obvious that substantial amounts of paraffins and materials boiling below methyl naphthalene are removed. These materials are primarily saturates and monocyclic aromatics and are not desired. Materials boiling above dimethylnaphthalene, such as acenaphthene and other tricyclic fused ring aromatics, as well as tri- and higher alkylated naphthalenes are also minimized by heart-cutting. The light cycle oil in Table I shows a typical 35.4% acenaphthene and higher boiling content, but this could obviously be reduced to an 8–12% level or lower by better fractionation which would make the feedstock more valuable.

The solvent utilized in accordance with the present invention is an organic sulfoxide of the general formula

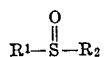

wherein $R_1$ and $R_2$ are organic radicals, such as aliphatic, alicyclic, aromatic or mixed hydrocarbon radicals or organic radicals containing a polar grouping, specifically oxygen, sulfur, nitrogen, halide and/or possibly allied atoms. $R_1$ and $R_2$ may be joined together to form a heterocyclic ring, such as tetrahydro- and dihydro-1-thiophene oxide, and their derivatives wherein one or more of the hydrogen atoms on the ring may be replaced by an organic radical of any of the types mentioned. The preferred organic sulfoxide from the standpoint of availability and cost is dimethylsulfoxide, often referred to as DMSO. Dimethylsulfoxide is a water-white, highly polar solvent which is completely miscible with water and very hygroscopic. Accordingly, care should be taken to prevent contamination of the dimethylsulfoxide by water from the atmosphere. Accordingly, the dimethylsulfoxide charged to the extraction unit should be essentially anhydrous dimethylsulfoxide. In this instance, the term "anhydrous" is meant to include dimethylsulfoxide containing less than about 1% water.

The ratio of dimethylsulfoxide to hydrocarbon feed to be utilized in accordance with the present invention should be between about 0.3 and 5.0 to 1. A preferred range is between 0.5 and 2.0 to 1 and a ratio of 1.5 to 1 has been found optimum. Since the constituents of the light cycle oil or other highly aromatic feed material may differ, the relative ratio of solvent to hydrocarbon feed cannot be precisely set forth in raw numbers. Therefore, the operable as well as the optimum ratio can be readily determined by the use of ternary phase diagrams such as that illustrated in FIG. 2 of the drawings.

A ternary phase diagram is a binodal curve plotted on triangular coordinate paper, showing the relative miscibilities of a three-component system. Percentage concentrations of all three components can be read directly from the plot. The area under the curve is the area of immiscibility and mixtures within this area will result in two-phase separation producing a raffinate phase and an extract phase. Mixtures above the curve will be miscible or homogeneous in all proportions. The shape and height of the curve show the maximum purification which can be obtained for one of the two components of the system, excluding solvent.

Any mixture under the curve, and which is therefore in the immiscibility range, can be split into a raffinate phase and an extract phase and each phase analyzed for the three components of the system. The analysis of the raffinate produces one point on the graph and the analysis of the extract provides a second point on the graph. A straight line connecting these two points and having the original mixture somewhere along the line is called a tie-line and the two points form a point on either side of the curve. The distances from the starting mixture to the terminal points are measures (inverse) of the volumes of raffinate and extract, respectively which will be produced.

The curve can be established by a titration technique. For example, mixtures of the two hydrocarbons may be made in increments of 10% and each mixture titrated with dimethylsulfoxide at a constant temperature until a blackout or cloud point is detected. Separation into an extract and a raffinate and the analysis of the raffinate is then carried out, as previously mentioned. This point forms a point on the right side of the curve. Conversely, mixtures of incremental volumes of solvent and the hydrocarbon of the top apex are then made and the hydrocarbon at the right apex is then titrated in the same manner. The phases are separated and analyzed and an appropriate point obtained to form the right side of the curve is obtained.

Figure 2:
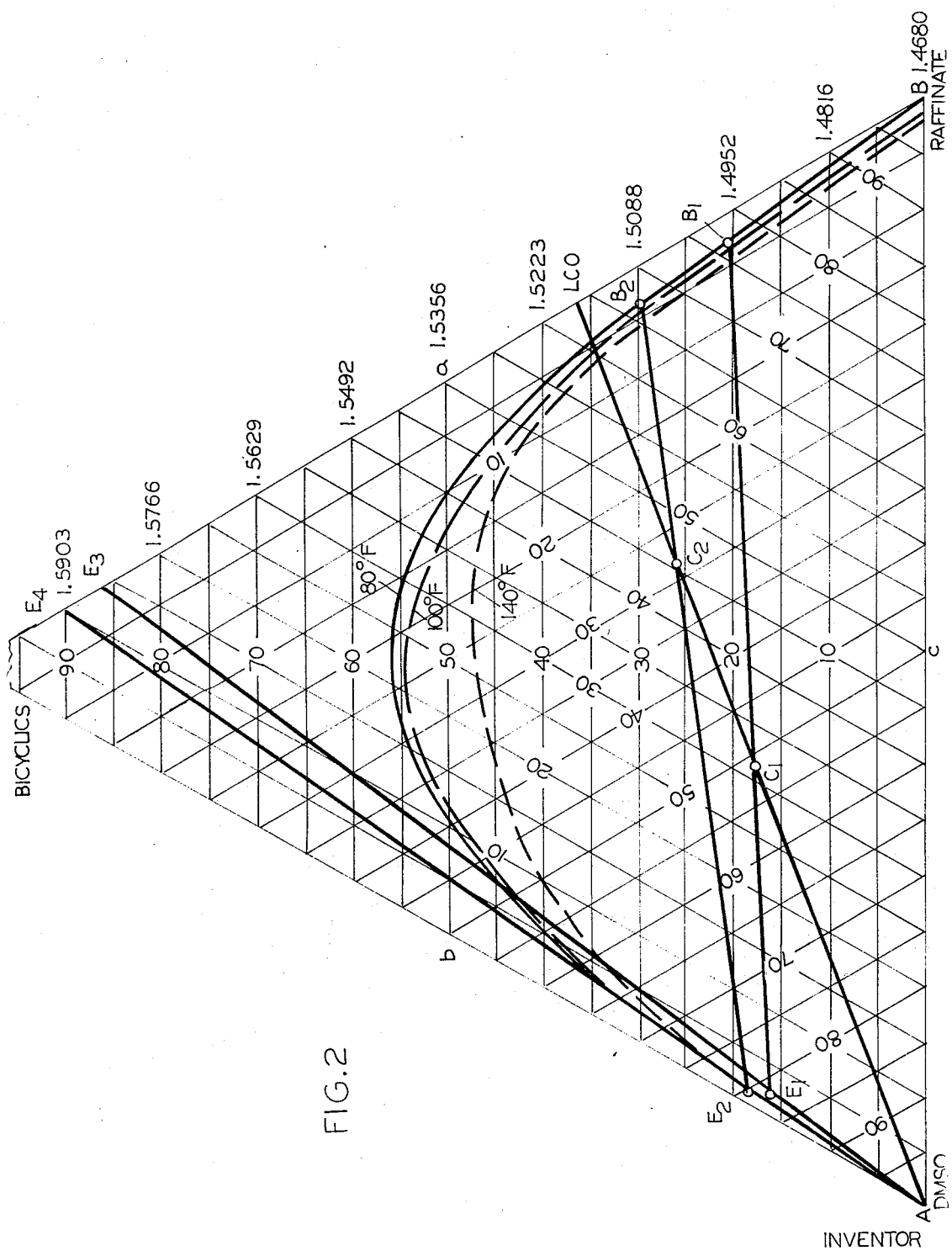
FIG. 2 is a ternary phase diagram illustrating the selection of optimum operating conditions in the extractor.

While the ternary diagram of FIG. 2 is not thermodynamically rigorous, it is used so long as one recognizes that a given temperature produces a single curve, a single plot must be at a single pressure for various temperatures and, when multicomponent systems, such as a light cycle oil is treated, it is necessary to arbitrarily chose a definition of polycyclics and non-polycyclics to be used as two of the three components, with the other component being the solvent utilized. As an aid, the refractive index of various polycyclic and non-polycyclic mixtures can be placed along the line connecting the apex C and the apex B of the plot. The line from the light cycle oil composition point to the apex A is a constant composition line of component C and component B. Point $C_1$ represents a 1:1 ratio of solvent to oil and point $C_2$ represents a 1:3 ratio of solvent to oil. Mixture $C_1$ splits into two phases, the raffinate phase $R_1$ and the extract phase $E_1$, which are plotted after analyzing their compositions as set forth above. $R_1$ falls on the right-hand side of the curve and $E_1$ on the left-hand side. Similarly, the mixture $C_2$ produces the right-hand point $R_2$ and the left-hand point $E_2$. Lines $E_1$–$C_1$–$R_1$ and $E_2$–$C_2$–$R_2$ represent two tie-lines, as previously discussed.

The distance $C_1$–$R_1$ represents the volume of extract phase produced and the length $E_1$–$C_1$, the volume of raffinate phase produced. The dashed lines drawn from the apex A to border line C–B, that is lines A---$E_1$---$E_3$ and A---$E_2$---$E_4$, illustrate at line B–C, the refractive index and composition which each extract phase will have.

The $E_4$ composition point represents the best extract that can be made by liquid phase extraction, at the temperature of interest (80° F.), that is 90% polycyclics and 10% nonpolycyclics. The $E_3$ composition point shows an 86% polycyclics composition, which differs only slightly from the $E_4$ product. Further, the amount of extract produced at the 1:3 (point $C_2$) ratio would be less than about half of that produced at the 1:1 (point $C_1$) solvent to oil ratio. Hence, it is obvious that the solvent to oil ratios may be optimized for economic purposes and to facilitate handling in the recovery systems in addition to determining workable ratios by the use of the ternary phase diagram.

FIG. 2 also illustrates curves prepared for different temperatures than the 80° F. curve just discussed.

The extraction temperature may vary to a certain extent except that it cannot be carried out below the freezing point of dimethylsulfoxide. Accordingly, a temperature range of about 65 to 200° F. may be utilized, and, preferably between 75 and 140° F.

It should also be recognized that the extraction may be carried out either in a single or multiple-stage extraction.

solvent extract phase, it was found that about 30% of the material was rejected as raffinate.

Figure 3:
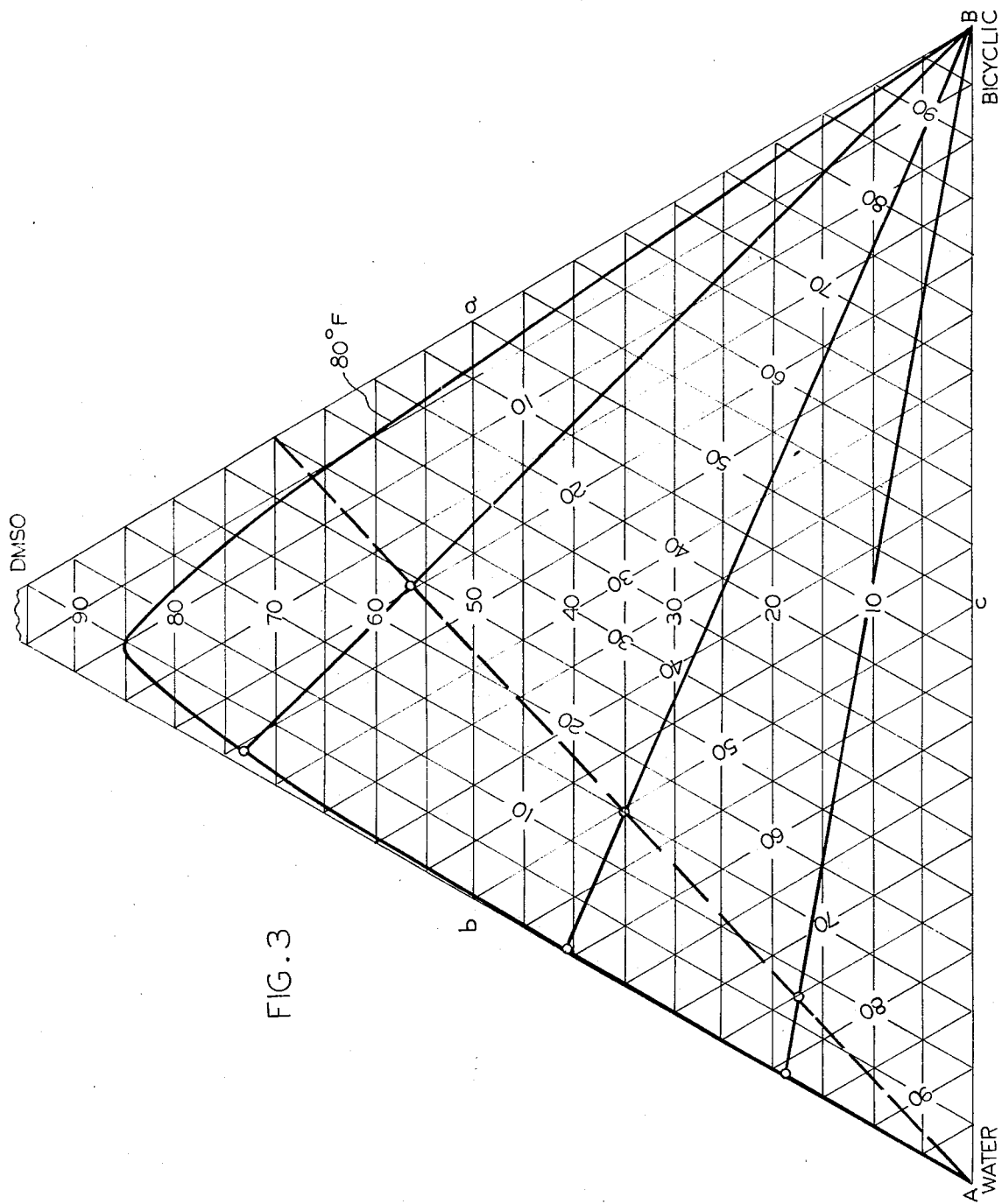
FIG. 3 is a ternary phase diagram illustrating the selection of optimum conditions for washing residual solvent from extraction products.

FIG. 3 of the drawings illustrates a three-phase diagram, similar to that of FIG. 2, but in the case of FIG. 3 the diagram illustrates the selection of the optimum conditions for freeing either an extract phase or a raffinate phase of residual dimethyl sulfoxide by displacement with water.

The following examples will illustrate the principles and advantages of the present invention.

Example 1

A series of tests were conducted utilizing the heart-cut fraction set forth in Table I as a hydrocarbon feed and dimethylsulfoxide as the solvent. The extraction and recovery were carried out essentially as shown in FIG. 1. In all tests, the temperature of extraction was maintained at ambient temperature. The solvent in Runs 1 through 7 was anhydrous when initially introduced and that of Runs 8 and 9 contained 5% and 2.5% water, respectively, based on the volume of solvent. This series of tests shows the utilization of a variety of solvent-to-feed ratios and the excellent results which can be obtained by the practice of the present invention. The efficiency of the solvent can be observed by measuring the refractive index of the raffinate and extract phases and comparing this with the refractive index of the feed material at 1.5145, the refractive index of substantially pure polycyclics of 1.605, and the index of substantially pure non-polycyclics of 1.468. Another measure of the efficiency of extraction, that is the separation of polycyclics from non-polycyclics, is the measure of the API gravity of the materials. For example, in the separation of light cycle oils, it is generally considered that a good separation obtains when the raffinate gravity is above 40° API and the extract gravity is between about 14 and 15° API.

Table II below shows the results of these tests.

TABLE II.—DMSO EXTRACTION

| Test | Single stage | | | | Multiple | | | | |
|---|---|---|---|---|---|---|---|---|---|
| | 1 | 2 | 3 | 4 | 5 | 6 | 7 | 8 | 9 |
| S:O ratio | 1:1 | 2:1 | 3:1 | 2:1 | 2:0 | 1:5 | 1:0 | 1:0 | 1:0 |
| Vol. percent raffinate | 38.5 | 22.7 | 15.6 | 21.7 | 17.7 | 24.2 | 32.9 | 41.1 | 40.2 |
| Extract | 61.5 | 79.3 | 84.4 | 78.3 | 82.3 | 75.8 | 67.1 | 58.9 | 59.8 |
| Raffinate: | | | | | | | | | |
| Vol. percent DMSO | 5.2 | 4.4 | 1.6 | (¹) | 1.9 | 3.1 | 1.2 | 3.3 | 1.3 |
| Vol. percent $R_1$ on LCO | 73.0 | 65.0 | 61.5 | 65.0 | 50.2 | 60.4 | 63.7 | 78.4 | 77.5 |
| $n_D^{20}$ | 1.4946 | 1.4834 | 1.4770 | 1.4833 | 1.4722 | 1.4713 | 1.4739 | 1.4933 | 1.4932 |
| API gravity | | | | | 36.9 | 37.1 | 36.3 | 31.5 | 31.5 |
| Extract: | | | | | | | | | |
| Vol. percent DMSO | 78.0 | 87.0 | 89.0 | 92.0 | 84.5 | 81.0 | 80.0 | 77.1 | 81.3 |
| Vol. percent $E_1$ on LCO | 27.0 | 35.0 | 38.5 | 35.0 | 49.8 | 39.6 | 36.3 | 21.6 | 22.5 |
| $n_D^{20}$ | 1.5788 | 1.5767 | 1.5742 | | 1.5804 | 1.5809 | 1.5811 | 1.5847 | 1.5879 |
| $\Delta n_D^{20}$ ($E_1$-$R_1$) | .0842 | .0933 | .0972 | | 0.1082 | 0.1096 | 0.1072 | 0.0914 | 0.0947 |
| Percent $H_2O$/($E_1$+S) | | | ²7.4 | 70.0 | 8.7 | 8.3 | | | 8.2 |
| 2d st. raff. (from Clarifier 42): | | | | | | | | | |
| Vol. percent of $E_1$ | | | 18.2 | 54.1 | 27.4 | 34.9 | | | 53.4 |
| Vol. percent of LCO | | | 7.0 | 18.9 | 13.6 | 13.8 | | | 12.0 |
| $n_D^{20}$ | | | 1.5315 | 1.5606 | 1.5620 | 1.5617 | | | 1.5774 |
| 2d extract (from Clarifier 42): | | | | | | | | | |
| Vol. percent of $E_1$ | | | 81.8 | 45.9 | 72.6 | 65.1 | | | 46.6 |
| Vol. percent of LCO | | | 28.6 | 16.1 | 36.2 | 25.8 | | | 10.5 |
| $n_D^{20}$ | | | 1.5837 | 1.5993 | 1.5905 | 1.5902 | | | 1.5982 |
| $\Delta n_D^{20}$ | | | 0.1067 | 0.1160 | 0.1183 | 0.1189 | | | 0.1050 |

¹ Not measured.   ² $nC_5$.

It has also been found that in the recovery of residual solvent from the raffinate phase, the oil or raffinate can be practically quantitatively displaced from the solvent by a ratio of water-to-solvent between about 1:4 and 10:1, preferably a ratio of 4:1 should be used.

The amount of water mixed with the extract phase to separate solvent from the extract may also vary, but in the particular instance tested, it was found that water in amounts of about 5% to 20% by volume based on the total volume of extract and solvent are adequate for separation of additional volumes of raffinate from the extract phase, as in clarifier 42. For example, using the optimum amount of about 7.5% water based on the total It is to be noted in Table II that, while the refractive index was slightly higher than, for example, Run 7, the yield was substantially lower. Thus, the advantage of anhydrous solvent is shown. By comparing the refractive indices and the volume of extract of the second extract of Runs 5, 6, and 9, a further effect of initial anhydrous conditions is indicated. Specifically, only 10.5% extract was obtained in Run 9 and the comparatively high refractive index indicates substantial loss of naphthalene precursors to the raffinate phase.

Example 2

Another series of Runs utilizing the same type of light cycle oil, heart-cut as in the previous tests was conducted in still another single-stage extraction unit. The feed material had an API gravity at 60° F. of 25° and contained about 10.5% of acenaphthene and higher boiling materials. It has been found that the solvent capacity can be substantially increased up to a certain point (where one phase only results) by increasing the temperature of extraction above the ambient temperature conditions previously exemplified. This series of tests therefore shows not only the results of using substantially reduced solvent-to-oil ratios but the effect of a series of higher temperatures on the extraction. Runs 10 through 18 were conducted utilizing dimethyl sulfoxide as the solvent, whereas, for comparison, the extraction in Run 19 was made with furfural containing 2% water at optimum conditions found for this particular solvent. The change in API gravity between the extract and the raffinate illustrate quite effectively the comparatively poor results obtained with furfural. As a matter of fact, the furfural extraction is almost as bad as a run (17) utilizing a solvent-to-oil ratio of only .39.

sulfoxide from the extract phase, and subjecting the separated extract phase to hydrodealkylation in the presence of hydrogen from an external source and a hydrodealkylation catalyst under conditions sufficient to produce naphthalene.

2. A method in accordance with claim 1, wherein the organic sulfoxide is dimethylsulfoxide.

3. A method in accordance with claim 1, wherein the hydrocarbon mixture is a light cycle oil obtained by the cracking of hydrocarbon mixtures.

4. A method in accordance with claim 1, wherein the extract phase is cooled and a further raffinate phase is separated from the extract phase.

5. A method in accordance with claim 4, wherein the further raffinate phase is combined with the first raffinate phase.

6. A method in accordance with claim 4, wherein the extract is distilled to separate the extract from the organic sulfoxide.

TABLE III.—EXTRACTION

| Test | 10 | 11 | 12 | 13 | 14 | 15 | 16 | 17 | 18 | 19 |
|---|---|---|---|---|---|---|---|---|---|---|
| Solv., g.p.h. | 0.37 | 0.79 | 1.11 | 0.78 | 0.62 | 0.62 | 0.56 | 0.28 | | |
| Oil, g.p.h. | 0.52 | 0.54 | 0.44 | 0.57 | 0.70 | 0.71 | 0.71 | 0.73 | | |
| Total thruput | 0.89 | 1.33 | 1.55 | 1.35 | 1.32 | 1.33 | 1.27 | 1.01 | | |
| Raffinate yield | 51 | 43 | 38 | 35 | 40 | 43.5 | 42.5 | 45 | 35.5 | 35.0 |
| Raffinate gravity | 36.5 | 39.7 | 41.7 | 41.2 | 40.4 | 40.2 | 38.7 | 36.5 | 41.2 | 36.5 |
| Extract gravity | 13.2 | 14.0 | 15.0 | 15.8 | 16.4 | 15.7 | 17.4 | 19.0 | 16.8 | 19.0 |
| ΔGravity | 23.3 | 25.7 | 26.7 | 25.4 | 24.0 | 24.5 | 21.3 | 16.3 | 24.4 | 17.5 |
| Temperature | 103 | 111 | 118 | 137 | 139 | 143 | 136 | 137 | 133 | 90 |
| Solv./oil | 0.71 | 1.46 | 2.52 | 1.39 | 0.86 | 0.88 | 0.80 | .39 | 1.39 | 1.19 |
| $n_D^{20}$ extract (oil) | 1.5723 | 1.5710 | 1.5704 | | | | | | | |
| Vol. percent in extract | 34.3 | 24.6 | 14.3 | | | | | | | |
| Gravity oil in extract | 13.0 | 14.4 | 14.5 | | | | | | | |

Example 3

The extract product of Run No. 13 was then subjected to hydrodealkylation in the presence of a catalyst containing about 12% chrome oxide on alumina, and under the conditions set forth in Table IV below. Table IV also gives an analysis of the product of the hydrodealkylation.

TABLE IV

Extract dealkylation

Operating conditions:
  WHSV _____ 1
  Temperature, ° F. _____ 1325
  Pressure, p.s.i.g. _____ 400
  $H_2$/HC _____ 13/1

Product analysis, wt. percent on feed:
  Benzene _____ 3.2
  Toluene _____ 5.7
  Xylene _____ 5.5
  X-N _____ 5.4
  Naphthalene _____ 26.4
  TN _____ 1.1
  M-Naphthalene _____ 18.7
  DiMN+BiPH _____ 4.8
  ACN and > _____ 0.5

Having illustrated and exemplified the present invention, it is obvious that numerous variations and modifications thereof will be apparent to one skilled in the art. Accordingly, the present invention is to be limited only in accordance with the appended claims.

I claim:

1. A method for the preparation of naphthalene from hydrocarbon mixtures containing polycyclic aromatics, including from 20 to 40% by volume of naphthalene precursors, monocyclic aromatics and saturated hydrocarbons comprising contacting the hydrocarbon mixture with an anhydrous organic sulfoxide, separating a raffinate phase from an extract phase, separating the organic 7. A method in accordance with claim 6, wherein the organic sulfoxide is recycled to the initial contacting step.

8. A method in accordance with claim 1, wherein the raffinate phase is freed of residual organic sulfoxide by contacting the same with water and thereafter separating the raffinate from a water-organic sulfoxide mixture.

9. A method in accordance with claim 8, wherein the water-organic sulfoxide mixture is distilled to separate the water from the organic sulfoxide.

10. A method in accordance with claim 9, wherein the organic sulfoxide is recycled to the initial contacting step.

11. A method of concentrating the content of polycyclic aromatics in hydrocarbon mixtures containing polycyclic aromatics, including, from 20 to 40% by volume of naphthalene precursors, monocyclic aromatics and saturated hydrocarbons, comprising contacting the hydrocarbon mixture with an anhydrous organic sulfoxide, separating a raffinate phase from an extract phase, mixing the extract phase with sufficient water to remove residual raffinate therefrom, and distilling the remaining extract phase to separate the same into an extract phase, organic sulfoxide, and water, respectively.

12. A method in accordance with claim 11, wherein the oragnic sulfoxide is dimethylsulfoxide.

13. A method in accordance with claim 11, wherein the hydrocarbon mixture is a light cycle oil obtained by the cracking of hydrocarbon mixtures.

14. A method in accordance with claim 11, wherein the extract phase is cooled and a further raffinate phase is separated from the extract phase.

15. A method in accordance with claim 14, wherein the further raffinate phase is combined with the first raffinate phase.

16. A method in accordance with claim 11, wherein the organic sulfoxide is recycled to the initial contacting step.

17. A method in accordance with claim 11, wherein the raffinate phase is freed of residual organic sulfoxide by contacting the same with water and thereafter separating the raffinate from a water-organic sulfoxide mixture.

18. A method in accordance with claim 17, wherein the water-organic sulfoxide mixture is distilled to separate the water from the organic sulfoxide.

19. A method in accordance with claim 18, wherein the organic sulfoxide is recycled to the initial contacting step.

References Cited
UNITED STATES PATENTS

| | | | |
|---|---|---|---|
| 2,304,289 | 12/1942 | Tongberg | 208—87 |
| 2,365,898 | 12/1944 | Morris et al. | 260—674 |
| 2,700,638 | 1/1955 | Friedman | 260—672 |
| 3,005,032 | 10/1961 | Makin | 260—674 |

DELBERT E. GANTZ, Primary Examiner

C. E. SPRESSER, Jr., Assistant Examiner

U.S. Cl. X.R.

208—87; 260—672, 674 SE